(12) United States Patent
Choueiri et al.

(10) Patent No.: US 11,958,734 B2
(45) Date of Patent: Apr. 16, 2024

(54) BOTTLE OPENER, DEVICE, SERVER AND METHOD FOR COUNTING BEVERAGE CONSUMPTION

(71) Applicant: WECHEER SA, Lausanne (CH)

(72) Inventors: Karim Choueiri, Broumana (LB); Khoi Quc Anh Luong, Ho Chi Minh (VN); Aurèle De Bosset, Lausanne (CH); Minh Ly, Ostermundigen (CH); Tai Le Tan Huynh, Ho Chi Minh (VN)

(73) Assignee: WeCheer SA, Lausanne (CH)

(*) Notice: Subject to any disclaimer, the term of this patent is extended or adjusted under 35 U.S.C. 154(b) by 1167 days.

(21) Appl. No.: 16/619,862

(22) PCT Filed: Jun. 12, 2018

(86) PCT No.: PCT/IB2018/054246
§ 371 (c)(1),
(2) Date: Dec. 5, 2019

(87) PCT Pub. No.: WO2018/229654
PCT Pub. Date: Dec. 20, 2018

(65) Prior Publication Data
US 2020/0207601 A1 Jul. 2, 2020

(30) Foreign Application Priority Data
Jun. 13, 2017 (CH) .............................. CH00767/17

(51) Int. Cl.
*B67B 7/16* (2006.01)
*G06F 16/532* (2019.01)
(Continued)

(52) U.S. Cl.
CPC .............. *B67B 7/16* (2013.01); *G06F 16/532* (2019.01); *G06K 7/1413* (2013.01);
(Continued)

(58) Field of Classification Search
CPC ....... B67B 7/16; B67B 7/18; B67B 2007/168; G06F 16/532; G06K 7/1413; G06K 19/06028; G06Q 50/12; G06V 2201/09
See application file for complete search history.

(56) References Cited

U.S. PATENT DOCUMENTS 3,412,634 A     11/1968 Lucarelli
4,607,543 A *   8/1986  Mah .......................... B67B 7/16
                                                               81/3.55
(Continued)

FOREIGN PATENT DOCUMENTS

CN          2913321 Y     6/2007
CN        104098057 A    10/2014
(Continued)

OTHER PUBLICATIONS

International Search Report & Written Opinion for PCT/IB2018/054246, dated Nov. 30, 2018, 15 pages.
Swiss Search Report for CH7672017, dated Feb. 27, 2018, 3 pages.

*Primary Examiner* — Chico A Foxx
(74) *Attorney, Agent, or Firm* — Blank Rome LLP (57) ABSTRACT

The invention concerns a bottle opener (101) for removing a cap (301) from a bottle (300). It comprises an image sensor (206) for capturing an image of the cap (301), a fulcrum surface (103) for contacting the cap and a hook (102,104) engageable under a flange (304) of the cap (301) for removing it from the bottle in response of a relative rotation of said bottle opener (101) with respect to the bottle (300) using the fulcrum surface (103) as a fulcrum. A removal detector (202, 204) is arranged to trigger a capture of an image by sensing a force between the fulcrum surface (103) and the hook (104) that exceeds a predefined threshold.

23 Claims, 5 Drawing Sheets

(51) Int. Cl.
  *G06K 7/14* (2006.01)
  *G06K 9/22* (2006.01)
  *G06K 19/06* (2006.01)
  *G06Q 30/00* (2023.01)
  *G06Q 30/02* (2023.01)
  *G06Q 50/12* (2012.01)

(52) U.S. Cl.
  CPC ....... *G06K 19/06028* (2013.01); *G06Q 50/12* (2013.01); *B67B 2007/168* (2013.01); *G06V 2201/09* (2022.01)

(56) References Cited

U.S. PATENT DOCUMENTS

| | | | |
|---|---|---|---|
| 11,017,049 B2* | 5/2021 | Flood | B30B 9/3007 |
| 2003/0103839 A1 | 6/2003 | Osborne et al. | |
| 2005/0028645 A1* | 2/2005 | Velez | B67B 7/16 81/3.4 |
| 2007/0095171 A1* | 5/2007 | Gold | B67B 7/16 81/3.55 |
| 2007/0146154 A1* | 6/2007 | Teller | G07F 13/025 340/606 |
| 2019/0197466 A1* | 6/2019 | Hand, III | G06V 20/00 |
| 2019/0330036 A1* | 10/2019 | Graham | G01K 13/00 |
| 2020/0226899 A1* | 7/2020 | Grunwald | G06K 19/06037 |
| 2021/0182778 A1* | 6/2021 | Kundra | G06F 3/04847 |

FOREIGN PATENT DOCUMENTS

| | | |
|---|---|---|
| CN | 105000518 A | 10/2015 |
| CN | 106586927 A | 4/2017 |
| DE | 102008046110 A1 | 7/2009 |
| DE | 202011110936 U1 | 5/2017 |
| EP | 1157965 A1 | 11/2001 |
| FR | 2880878 A1 * | 1/2005 |
| FR | 2880878 A1 | 7/2006 |
| GB | 2102997 A | 2/1983 |
| GB | 2492552 A | 1/2013 |
| WO | WO-01/43096 A2 | 6/2001 |
| WO | WO-2004/110817 A1 | 12/2004 |

* cited by examiner

BOTTLE OPENER, DEVICE, SERVER AND METHOD FOR COUNTING BEVERAGE CONSUMPTION

RELATED APPLICATIONS

This application is a national phase of PCT/IB2018/054246, filed on Jun. 12, 2018, which claims priority to Swiss Patent Application No, CH00767/17, filed on Jun. 13, 2017. The entire contents of these applications are hereby incorporated by reference.

FIELD OF THE INVENTION

The present invention concerns a bottle opener, notably for crown cap, a device and a server for collecting data provided by a bottle opener.

The invention further concerns a method for counting beverage consumption.

DESCRIPTION OF RELATED ART

Many consumable beverages both alcoholic and non-alcoholic typically are distributed to commercial establishments and consumers in containers, usually metal cans or glass bottles, provided with caps which may be pried off with a dedicated device, i.e. a bottle opener. These caps, also known as crown corks, crown seals, and crown caps, are designed for single use. This cap is normally made from metal and comprising a flange designed to be bent or crimped around an annular looking shoulder of a bottle.

It is desirable to know the beverage consuming and behaviour of clients of consumable beverages distributed in containers, directly or through commercial establishments, for stock management, sale supervision and marketing.

In order to address this problem, bottle openers have been arranged to detect the opening of a drink container that (normally and shortly) precedes the moment of consumption of said beverage. This is generally the case of beverages that degrade in quality once opened.

GB2102997 describes a code reader for scanning concentric codes printed on caps of bottle before cap removal. The code reader comprises a blocking system for preventing cap removal until the code has been validly acquired.

WO01/43096 describes a wall-mounted bottle opener including a video camera positioned so as to capture an image of the label of the bottle when inserted in the opener. The insertion of the bottle in the opener is detected as a result of an interruption of an infrared beam between an IR LED and a receiver.

FR2880878 describes a bottle opener comprising a cap insertion detector configured to trigger a camera for recording an image of the inserted cap so as to identify a distributed bottle.

US2007095171 describes a bottle opener configured to count the numbers of bottle opened by detecting an insertion of the cap within the engaging opening of the bottle opener.

However, these bottle openers suffer from inaccuracies, notably in case the user multiplies his attempts to remove the same cap as well as a result of interactions of the bottle opener with other metallic objects.

DE102008046110 describes a bottle opener comprising a microphone for detecting an opening noise indicating a removal of the cap. However, audio capturing is generally perceived as invasive and intrusive by users, while regulated by national and governmental data protection laws.

U.S. Pat. No. 4,607,543 describes a bottle opener having a cap removing head that is resilient mounted on an extremity of the bottle opener's holder. The bottle opener comprises a counter that is increased at each relative deflection of the holder induced by the leverage movement for removing a cap from a bottle. However, users generally perceive this deflection as uncomfortable and unfamiliar, as well as a result of an abnormal functioning of the bottle opener.

BRIEF SUMMARY OF THE INVENTION

An aim of the invention is to provide a collecting system for collecting information about beverage consumptions that is devoid, or at least mitigates, the drawbacks of known systems.

A particular aim is to provide a cost-effective collecting system providing reliable information about beverage consumptions.

Another aim is to provide a collecting system allowing a beverage manufacturer or beverage brand to collect data for better understand the consumption behaviour of their beverage consumers.

Another aim is to provide a collecting system allowing a tender of a commercial establishment and/or a user to collect data about theirs beverage consumptions, beverage preferences and behaviours.

According to the invention, these aims are achieved by means of the bottle opener of claim 1, the device of claim 18, the server of claim 20 and the method of claim 23.

This solution permits a count of beverage consumption while taking in account the typologies and/or the brands of consumed beverage by means of the captured image. In fact, it is common to place a graphical sign (e.g. a brand image, a logo, a bar code, an alphanumerical message or combination thereof), on the surface of the caps identifying the beverage and the brand.

In one embodiment, either the hook or the fulcrum surface is configured to move and/or rotate with respect to the body of the bottle opener (i.e. with respect to the other between the hook and the fulcrum surface), this from a rest position, in response of a force applied between the hook and the fulcrum surface exceeding the predefined threshold. The cap removal detector is thus arranged to sense a relative positioning (e.g. a pre-defined position) of the hook or of the fulcrum surface with respect to the body of the bottle opener.

This solution provides a simple and cost-effective detection of a force applied between the hook and the fulcrum when the magnitude thereof exceeds a predefined threshold.

In one embodiment, the bottle opener comprises a processing unit configured to recognize and/or identify a graphical sign within the captured image. The processing unit can comprise, or have access to, a database storing a plurality of graphical signs. Each graphical sign can be provided with additional information about the contained beverage, such as the typology of the beverage (e.g. alcoholic, non-alcoholic, soda, beer, etc.), and the brand, as well as additional information about the bottle, such as the volume of the bottle, the production lot, or a bottle-specific serial number.

In one embodiment, the bottle opener is configured to provide the acquisition time and/or timestamp to the captured image preferably in the form of a universal time reference, such as UTC. This solution permits to collect temporal information about bottle opening events.

In one embodiment, the bottle opener is the bottle opener is configured to provide a geographical indication and/or coordinate to the captured image. This solution permits to collect spatial information about bottle opening events.

In one embodiment, the bottle opener is configured to store a device digital identifier of, or assigned to, the bottle opener and/or a user digital identifier assigned to a user of the bottle opener. This solution permits to provide statistical data about the individual who served the beverage bottle and/or who was the intended consumer of the beverage.

Preferably, the bottle opener comprises a data transmitter for sending the captured image, the device digital identifier, the user digital identifier, the acquisition time and/or timestamp, and/or geographical indication and/or coordinate to another device for further processing. This permits a user's or bartender's device to collect and display notices about their consumptions. This solution further permits a server to collect data from a plurality of bottle openers so as to provide reliable information about beverage consumptions as function of beverage typologies, brands, temporal intervals and/or geographic locations.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Many consumable beverages both alcoholic and non-alcoholic typically are distributed to commercial establishments and consumers in containers, usually metal cans or glass bottles, provided with caps which may be pried off with by means of a dedicated device generally known as an "opener". These caps are normally made from metal and are designed for single use.

There is today an interest about not only counts of beverage consumptions but also on consumption behaviour of beverage consumers. Today, this information can be obtained, either indirectly by costly and time-expensive interviewing, observation and/or questionnaires, or by monitoring systems lacking in quality, reliability and nearness to the moment of consumption of the beverage.

The invention concerns a bottle opener for removing a cap from a bottle containing a beverage by means of a leverage force applied to the cap, while collecting robust data for assessing beverage consumptions and behaviours.

Figure 1:
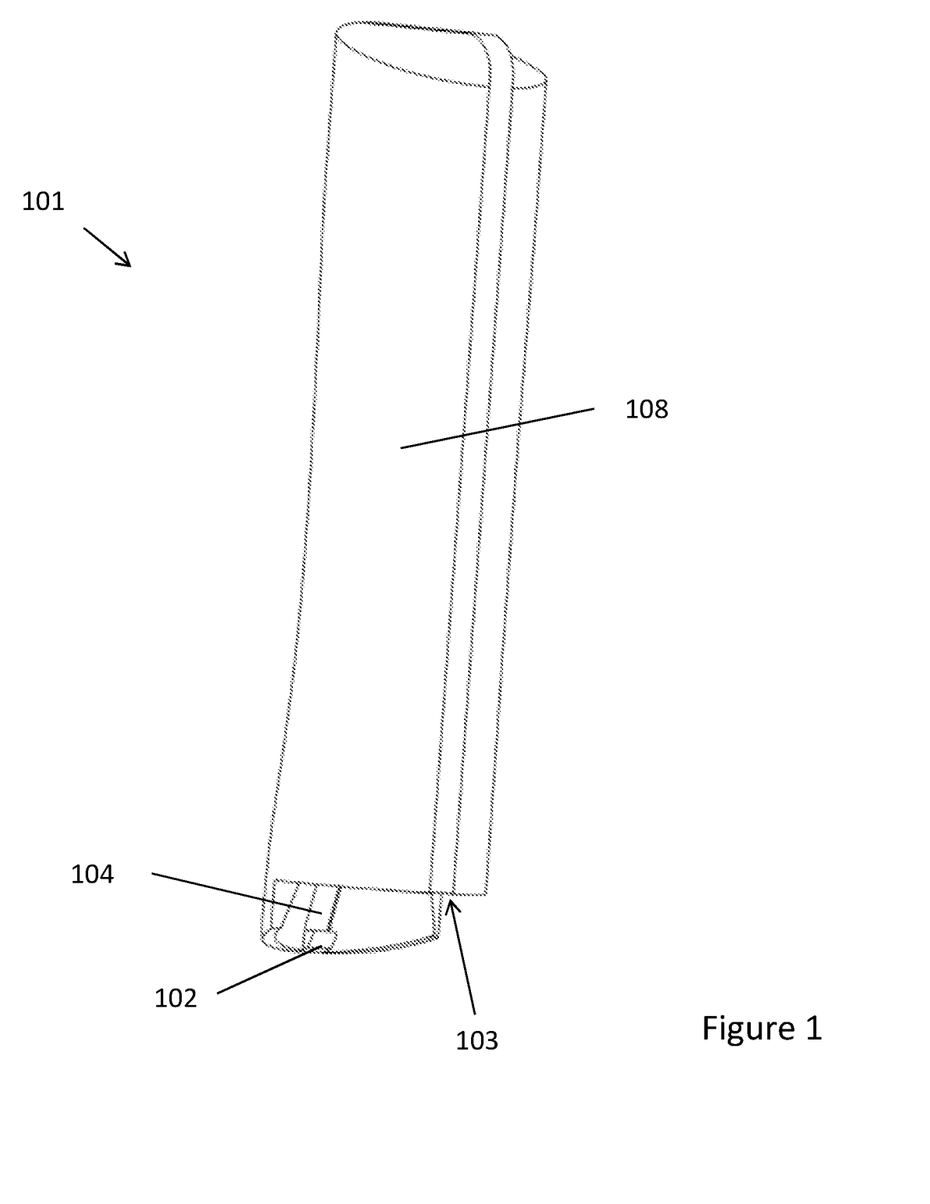
FIG. 1 shows a view of an exemplary embodiment of a bottle opener according to the invention.
Figure 2:
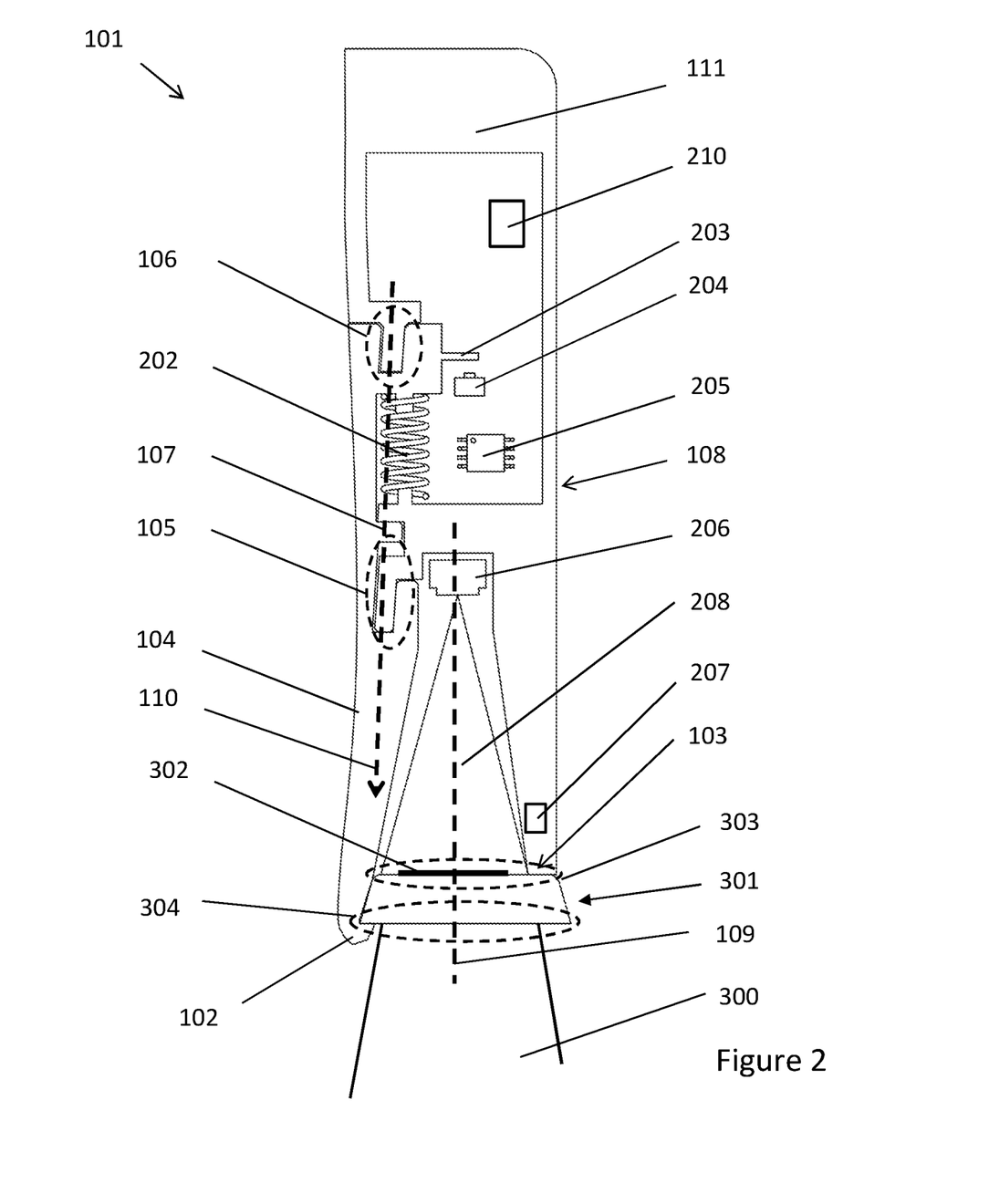
FIG. 2 shows a section view of the bottle opener of FIG. 1.

The bottle opener can be configured to be portable, as illustrated in FIGS. 1 and 2, and/or to be mounted on a wall or on a surface of a table or counter of a commercial establishment.

The bottle opener in the form of a portable bottle opener is provided with a power source, notably in form of a (rechargeable) battery, for powering the electrical and electronics components thereof.

The cap 301 of beverage bottles is generally made of metal. The cap comprises an external, round surface 303 surrounded by a flange 304 designed to be bent or crimped around an annular looking shoulder of the bottle so as to provide a closure. This type of tap is also generally known as crown cork, crown seal, or crown cap.

The bottle opener comprises a fulcrum surface 103 for contacting a portion 303 of the cap, notably of the external surface 303, and a hook 104 having a tip 102 configured to be engageable under the (typically pleated) flange 304 of the cap 301, i.e. engageable in portion of the flange along a direction towards the external surface of the cap. The tip 102 can have a form of a claw or of a lip.

The cap, once in the removing position (i.e. engaged by the hook while being in contact with the fulcrum surface 103), can be removed from the bottle by a relative rotation of the bottle opener 101 with respect to the bottle 300 using the fulcrum surface 103 as a fulcrum. The bottle opener of FIGS. 1 and 2 is provided with a handle 108 providing an ergonomic surface for one hand so as to facilitate this leverage movement with a single hand.

The body 111 (e.g. the structure and/or frame) of the bottle opener and/or the handle 108 is preferably made from a rigid material such as plastic, wood, metal or composite.

Caps are generally labelled or marked with a graphical sign 302 on their external surface 303. The graphical sign is frequently the logo, the slogan or saying of the beverage brand, a bar code or a unique identifying sign for product tracking.

The bottle opener 101 comprises thus an image sensor 206 for capturing an image of the external surface 303 of the cap 301 so as to capture the graphical sign placed on it. The image sensor can be configured to sense not only visible spectrum but also infrared irradiations (IR, e.g. near IR) and/or ultraviolet irradiations (UV). IR data can be used to sense the temperature of the cap so as to estimate the temperature of the beverage contained in the bottle when opened. UV data can be used to sense graphical sign on the bottle cap being made of particular invisible inks (also called security ink), i.e. ink not visible to the human eye while visible (fluorescent or absorbing) under ultraviolet light. The image sensor and/or the bottle opener can comprise means for illuminating the cap, such as visible spectrum and/or IR and/or UV light source (e.g. in form of one or more LEDs). The image sensor can be a camera configured to acquire a single or a predefined number of successive images.

In the embodiment of FIGS. 1-2, the image sensor 206 is positioned so as to capture an image of the cap along a capturing direction being substantially perpendicular to the external surface, when the cap is the removing position.

In order to provide robust and reliable information about beverage consumptions, the bottle opener comprises a cap removal detector 202, 204 for detecting the temporal moment of the removal of the cap from the bottle for recording it, notably by capturing an image of the cap for providing data about the beverage and/or by validating (e.g. an already and/or independently captured) image provided by the image sensor.

The cap removal detector is arranged to provide an indication that a removal of the cap of the bottle is underway by sensing a force applied to the cap and likely indicating (i.e. with a high degree of certainty) that the bottle is underway to be opened for the first time and that the removal of the cap is passing the point of no return.

The cap removal detector is arranged to sense a force between the fulcrum surface 103 and the hook 104 so as to trigger the image sensor for capturing an image of the cap, notably of the external surface thereof, when the sensed force exceeds a predefined threshold.

According to the invention, a trigger of a capture of an image means can be a release of an image already acquired (i.e. before the triggering) and/or a command to the image sensor so as to initiate an acquisition of an image.

The cap removal detector can be arranged to validate one image previously acquired by the image sensor, notably in case the image sensor is configured to taken one or a plurality of images either systematically (e.g. at predefined time interval) or when a cap is sensed (e.g. by a metal sensor 207) or when a hand of the user is sensed on the handle (e.g. by a capacitive sensor).

Alternatively or complementarily, the cap removal detector can be arranged to control the image sensor so as to initiate an acquisition of an image of a cap once the sensed force exceeds a predefined threshold.

The sensed force corresponds to the traction force generated by the user and applied to the flange of the cap by the tip 102 of the hook 104 while the fulcrum surface 103 operates as a fulcrum on a portion of the surface of the cap.

This force can be measured directly, e.g. by means of a sensing element providing a measure of the force between the fulcrum surface 103 and the hook 104, such as a strain sensor and a force sensor, or indirectly by detecting another physical phenomena of the bottle opener induced by a force applied between the fulcrum surface 103 and the hook 104.

The cap removal detector can comprise a sensing element, such as a strain gauge, placed on a deformable portion of the bottle opener located between the hook and the fulcrum surface, so as to sense and/or detect a deformation thereof. The deformable portion can be a deformable portion of the hook 104 and/or of the fulcrum surface 103.

Alternatively, the hook 104 or the fulcrum surface 103 can be configured to move and/or rotate with respect to the other, i.e. with respect to the body 111 of the bottle opener.

The cap removal detector can thus be configured to directly measure or sense the magnitude of the force applied between the hook 104 and the fulcrum surface 103 by a force sensing element (e.g. a force sensor, a force-sensing resistor) located, for example between the hook 104 or the fulcrum surface 103 and the body 111.

In the embodiment of FIGS. 1-2, the cap removal detector is configured to indirectly detect a force applied between the hook and the fulcrum surface when the magnitude exceeds the predefined threshold.

In fact, the hook and/or the fulcrum surface can be advantageously configured to provide a magnitude of the movement and/or rotation that is function (e.g. proportional) to the magnitude of the applied force, e.g. by means of an elastic or resilient element providing a force opposing to the movement and/or rotation of the hook and/or fulcrum surface. The cap removal detector is then configured to sense a relative positioning of the hook with respect to the fulcrum surface (and vice versa) so as to detect a force applied between the hook and the fulcrum surface whose magnitude exceed the predefined threshold.

The hook and/or the fulcrum surface can be configured to move and/or rotate from the rest position in response of a force applied between the hook and the fulcrum surface whose magnitude exceed the predefined threshold. A force exceeding the threshold can be thus detected by the cap removal detector by sensing the hook and/or the fulcrum moving from and/or leaving the rest position.

Alternatively, the hook and/or the fulcrum surface can be configured to move and/or rotate from the rest position to a stop position in response of a force applied between the hook and the fulcrum surface whose magnitude exceed the predefined threshold. A force exceeding the threshold can be thus detected by the cap removal detector by sensing the hook and/or the fulcrum in the stop position.

These arrangements provide a simple, robust and cost-effective detection of a force applied to the cap that likely indicates that the bottle is underway to be opened for the first time and that the removal of the cap is passing the point of no return.

The hook and/or the fulcrum surface can be configured to move and/or rotate from the rest position in response of a force applied between the hook and the fulcrum surface whose magnitude exceed the predefined threshold. A force exceeding the threshold can be thus detected by the cap removal detector by sensing the hook and/or the fulcrum moving from and/or leaving the rest position.

Alternatively, the hook and/or the fulcrum surface can be configured to move and/or rotate from the rest position to a stop position in response of a force applied between the hook and the fulcrum surface whose magnitude exceed the predefined threshold. A force exceeding the threshold can be thus detected by the cap removal detector by sensing the hook and/or the fulcrum in the stop position.

In the embodiment of FIGS. 1-2, the hook is configured to move with respect to the fulcrum surface along a translation axis 110 with respect to the fulcrum surface. The bottle opener comprises thus a guide (e.g. in form of a pair of slides 105,106 comprising sliding surfaces, recess and protuberances) for guiding the hook along the translation axis.

The guide further comprises a stop 107 for stopping the translation movement of the hook to a pre-defined stop position with respect to the fulcrum surface. The stop can be a protuberance 107 of the hook arranged to enter in contact with a surface of the body of the bottle opener when the hook reaches the pre-defined stop position.

The bottle opener can be configured so as the distance between the rest position and the stop position is less than 1 cm, preferably less than 3 mm, so as to avoid a perturbation of the removing movement and an unfamiliar perception.

The translation axis 110 is preferably substantially perpendicular to the external surface 303 of the cap when the cap is in the removing position. According to the invention, the term substantially perpendicular indicates an angle between the translation axis and the external surface 303 that is comprises between −30° to +30°, preferably between −15° to +15°. These inclinations permit to efficiently generate a translation of the hook in response of a force applied to the bottle opener by the user for removing the cap.

Advantageously, the body 111 of the bottle opener, notably the handle 108, is in form of an elongated structure along an axis substantially perpendicular to the external surface 303 of the cap when the cap is in the removing position. This arrangement avoids the hook to protrude from the external surface of bottle opener (notably from the external surface of the handle) when moving from the rest to the stop position.

The movement of the hook along the translation axis 110 is opposed by a force provided by an elastic element, e.g. a spring 202, located between a portion of the body of the bottle opener and a surface of the hook 104. This elastic element can be a pre-stressed elastic element, notably by means of an adjustable compression mechanism.

The force applied by the user to the body 111, notably by means of the handle 108, creates a traction force in the tip part 102 of the hook 104, which is moveable with respect to the fulcrum surface 103. The translating movement of the hook is thus incrementally contrasted by a force generated by the elastic element 202 up to the stop position. By pre-stressing the elastic element, the initial force required to create the movement may be defined and/or adjusted.

The cap removal detector detects the hook in the stop position by means of a switch 204, electrically or mechanically, actuated by a portion 203 of the hook when it reaches the stop position. The actuation of the switch provides an indication that the predefined force has been achieved.

The proposed bottle opener 101 reduces the risk of recording a sequence of successive positioning of the same cap within the bottle opener as well as unsuccessful attempts to remove a cap, permitting a more robust and reliable count of beverage consumption while taking in account the typologies and/or the brands of consumed beverage by means of the captured image.

Furthermore, to reduce the risk of recording unreal cap removals, notably due to fraud or cheating attempts, the bottle opener can advantageously comprise a sensor 207 for detecting a metallic cap so as to either validate the captured image or to block/enable a triggering of the image sensor.

The sensor 207 can be located in close proximity to the surface of the bottle opener designed to receive the cap so as to sense the cap when located in the removing position.

The metal sensor 207 can be configured to enable the sensing image for acquiring either an image or a plurality of images of the cap, e.g. at a predefined time interval.

Alternatively or complementarily, the metal sensor 207 can be integrated in the cap removal detector so as an image is triggered when both following conditions are met: the sensed force exceeds the predefined threshold and a metallic cap is detected.

As previously introduced, it is common to have on the surface of the caps a unique or brand identifying graphical sign such as a brand image, logo, bar code, or combination thereof.

The captured image can be advantageously processed for recognizing and/or identifying the graphical sign 302 within the captured image, eventually by matching the graphical sign 302 with signs of a database, so as to trigger suitable actions.

For example, if the graphical sign 302 is, or comprises, a kind of unique identifier, such as a bar code, a query to a (remote) database can provide an indication (or a verification) that the bottle was opened for the first time (i.e. the database comprises no record of an opening of this bottle). A query to a database can also provide an indication if the bottle was produced in a licensed factory and duly registered into the database.

A graphical sign in form of, or comprising, an brand identifying graphical sign can provide, by means of a query to a database, additional information about the contained beverage of the opened bottle, such as the typology of the beverage (e.g. alcoholic, non-alcoholic, soda, beer, etc), and the brand. The database can further provide additional information about the bottle, such as the volume thereof, the production lot, or a bottle-specific serial number.

The bottle opener can thus comprise of a processing unit 205 configured to recognize and/or identify a graphical sign 302 within the captured image. The processing unit 205 can be an IC, a microprocessor, a microcontroller, or a DSP, a FPGA or a dedicated electronic circuit. Advantageously, the processing unit is in form of a programmable processing unit. Advantageously, the processing unit has access a data and/or instruction memory, preferably located in the bottle opener, eventually integrated in the processing unit.

In order to, the processing unit 205 has advantageously access to a database storing a plurality of graphical signs so as to recognize and/or identify the graphical sign, notably by image or features matching. The database can be located in the bottle opener, e.g. by means of the data and/or instruction memory. Alternatively or complementarily, the database, or a subset of the database, can be remotely located and accessible by the processing unit by means of a data link.

The bottle opener permits thus a count of beverage consumption while taking in account the typologies, the brands and/or licensing constraints related to the consumed beverage by means of the captured image.

The bottle opener can be advantageously configured to provide a geographical indication and/or coordinate of the place where the bottle opener was used for removing the cap. This solution permits to provide spatial information about bottle opening events.

The bottle opener can thus comprise a positioning module, eventually executed by and/or integrated in the processing unit 205, configured to provide to the captured image a geographical indication and/or the geographical coordinate about the location where the bottle opener was used. This solution permits to collect spatial information about bottle opening events.

The positioning module can comprise a local or global positioning system, providing a positioning based on well-known located beacons (e.g. telecommunication antennas network, Wi-Fi accessing point, Bluetooth beacon, GNSS, GPS, GLONASS, Galileo navigation system).

Alternatively or complementarily, the positioning module can be configured to obtain the geographical indication and/or the geographical coordinate of the place by accessing a local or global positioning system of a user's device. The user's device can be a temporarily or long-term locally located device, a transportable or a portable device, e.g. a smartphone, a watch, a tablet, a PC or a server.

Alternatively or complementarily, the positioning module can be configured to provide a geographical indication and/or a geographical coordinate of a predefined, static place. This place can be defined manually or semi-automatically by the user or tender of the commercial establishment where the bottle are served (e.g. bartender) and then stored, for example, in the data and/or instruction memory.

The bottle opener can be advantageously configured to provide an acquisition time and/or timestamp to the captured image, preferably in the form of a universal time reference, such as UTC, so as to provide temporal information about bottle opening events.

The bottle opener can thus comprises a timekeeping module, eventually executed by and/or integrated in the processing unit 205 configured to provide the acquisition time and/or timestamp at the time of the image was captured.

The timekeeping module can be configured to receive a clock indication and/or synchronization by accessing a data network or the user's device. Alternatively or complementarily, the timekeeping module can be configured to receive a clock indication and/or synchronization by the local or global positioning system of the positioning module.

The bottle opener can be advantageously configured to assign a user identifier and/or a device identifier to the captured image so as to provide information about the use of the bottle opener, the individual who served the beverage bottle and/or about the consumer of the beverage.

The bottle opener can thus be configured to store the device digital identifier of, or assigned to, the bottle opener and/or the user digital identifier assigned to a user of the bottle opener. The device and the user digital identifier can be stored in the data and/or instruction memory.

Alternatively or complementarily, the device and/or user digital identifier can be provided and/or validated by emitting a wireless identity beacon signal, e.g. a Bluetooth beacon, so as a device can obtain the device and/or user digital identifier assigned to an image by receiving this beacon signal (proximity detection). This can be useful for indicating and/or validating that the user/bartender is in close proximity to the bottle being opened.

The bottle opener is configured to register the collected information about the beverage bottle (i.e. the captured image, the device digital identifier, the user digital identifier, the acquisition time and/or timestamp, and/or the geographical indication and/or coordinate) by storing them in the data and/or instruction memory of the bottle opener and/or by transmitting them to another device.

The bottle opener can thus comprise a data transmitter 210 configured to send:
- the captured image, and/or
- an indication that the graphical sign within the image has been recognized and/or identified within the graphical signs of the database, and/or
- the device digital identifier, and/or
- the user digital identifier, and/or
- the acquisition time, and/or
- the timestamp, and/or
- the geographical indication, and/or
- the geographical coordinate to a (paired) device or server for further processing.

The data transmitter 210 can be configured to send the battery level and/or the temperature of the bottle.

The data transmitter can be configured to transfer data in an analog and/or digital form via a wired and/or wireless communication channel. The data transmitter is advantageously configured to communicate data through local and/or wide area network infrastructure (e.g. LAN, WLAN, WAN, LPWAN, LPN) eventually by means of mobile telecommunication cellular network (e.g. GSM, UMTS, LTE, 2G, 3G, 4G). Alternatively or complementarily, the data transmitter is advantageously configured to locally communicate data to a device by means of short distance wireless channel, such as Bluetooth, Bluetooth Low Energy (BLE), ANT, ZigBee, NFC. Alternatively or complementarily, the data transmitter can be configured to transmit data via a physical link, such as a USB cable, eventually in mini, micro or USB-C format.

The data transmitter can configured to operate in a bi-directional way, i.e. configured to receive information by other (e.g. paired) devices (e.g. user's or tender's device, a server providing bottle openers services) or systems (e.g. telecommunication antennas, Wi-Fi accessing points, data networks).

Received information can be, for example: a database of graphical signs, an database update, a set of instruction to be executed by the computational unit of the bottle opener (e.g. firmware, software updates), a positioning, a flight-time, a geographical indication, a geographical coordinate, a clock indication, a clock synchronization, a device digital identifier, a user digital identifier or a combination thereof.

Figure 4:
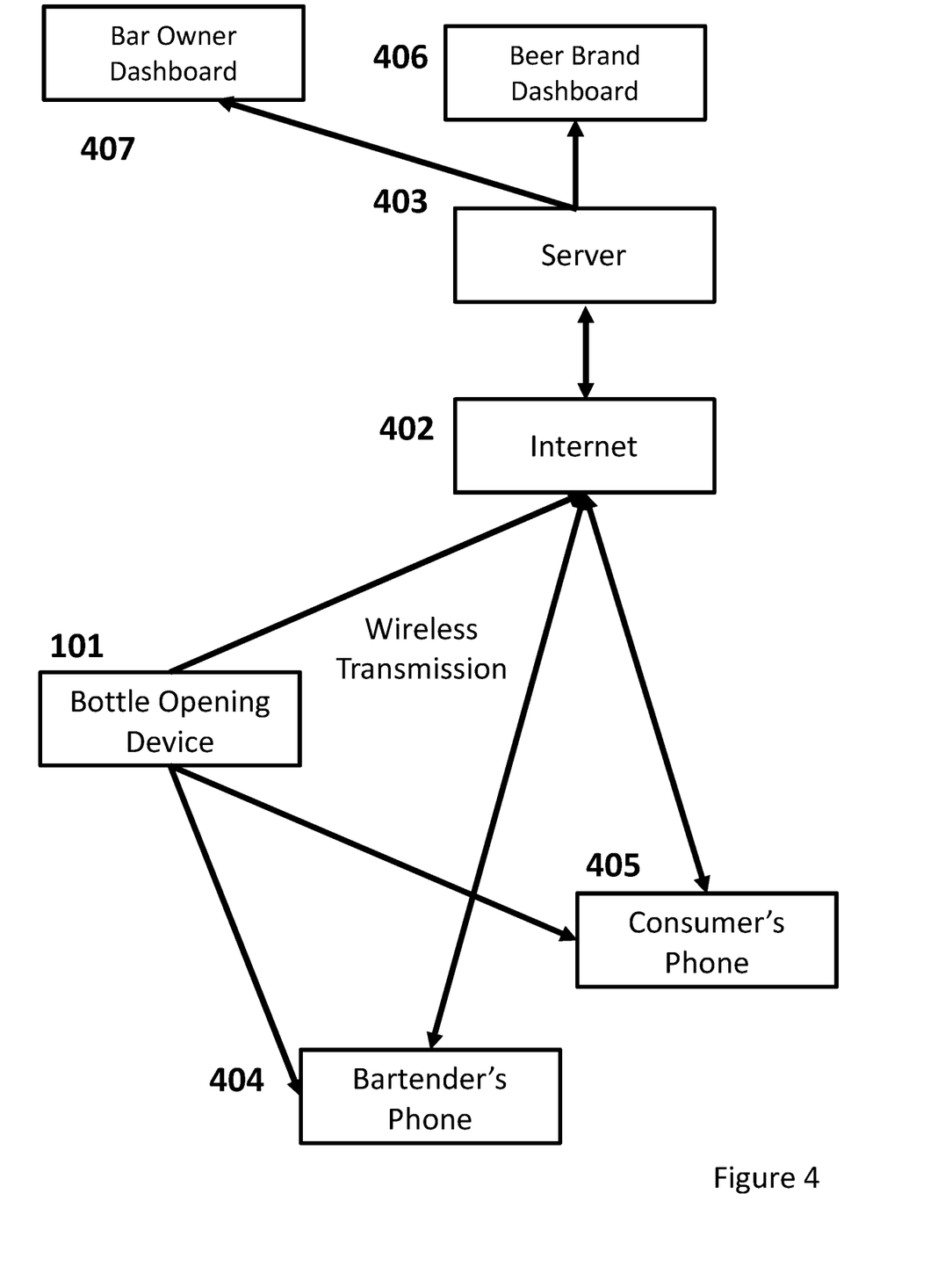
FIG. 4 shows an exemplary embodiment of the data collecting system according to the invention.

A beverage manufacturer or beverage brand can thus collect information about beverage consumptions, notably by means of a server 403 configured to collect information provided by a plurality of bottle openers, via theirs data transmitters (FIG. 4).

The server 403 can thus be configured to receive an indication that a graphical sign within a captured image of a bottle opener is recognized and/or identified within a database of graphical signs.

Alternatively or complementarily, the server can be configured to obtain said indication by receiving the captured image and by process it so as to recognize and/or identify the sign within the image by means of a database of graphical signs, notably by image or features matching.

The server is further configured to receive the acquisition time, the timestamp, the geographical indication and/or the geographical coordinate assigned to the captured image.

Advantageously, the server is further configured to receive the device digital identifier and/or the user digital identifier assigned to said image so as to collect information about who served and/or who consumed the beverage.

The server is then configured to process the received data for providing beverages consumptions, preferably in form of counts and/or statistics taking into account typologies of commercial establishment and/or geographical and temporal factors.

This solution further permits a server to collect data from a plurality of bottle openers so as to provide reliable information about beverage consumptions as function of beverage typologies, brands, temporal intervals and/or geographic locations.

The user of the bottle opener and the tender of the commercial establishment can also collect data about their consumption of beverage and/or the served beverages by means of a device 404, 405 connected (paired) to the bottle opener and/or to the server (FIG. 4).

In particular, the user and/or the tender can pair his device, notably his phone or smartphone e.g. by means of an application running on it, with the bottle opener and/or the server so as to receive selected data concerning consumed theirs consumed or served beverages.

The device 404, 405, notably a portable device such as a smartphone, can thus be configured to receive, from the bottle opener 101 and/or from the server 403, an indication that a graphical sign within an image provided by a bottle opener is recognized and/or identified within a list of pre-defined graphical signs.

Alternatively or complementarily, the device can be configured to obtain said indication by receiving the captured image (from the bottle opener 101 and/or from the server 403) and process it so as to recognize and/or identify the sign within the image by means of a database of graphical signs, notably by image or features matching.

The device 404, 405, is further configured, in response to said indication, to display a predefined image, preferably a sequence of pre-defined images, on a display unit of the device, the predefined image or sequence of images being defined based on the recognized and/or identified graphical sign.

The predefined image or sequence of images can be represent a message for notifying, informing and/or celebrating one or more user(s) and/or tender(s) for having selected particular beverage.

The device can be further configured to
- receive a device or user digital identifier assigned to said image and/or said bottle opener; and to
- to display a predefined image, preferably a sequence of pre-defined images, based on the received device or user digital identifier.

The predefined image or sequence of images can be the captured image of the cap, a brand image (e.g. image of the database providing the matched graphical sign) or a brand sequence of images. The predefined image or sequence of images can represent a message for notifying, informing, warning, advising, celebrating and/or thanking the user having opened a particular beverage bottle and/or the tender for having served a particular beverage. This can be advertising from a beer brand owner or possibly a collection of previously opened beer bottles as well as a count and collection of opened bottles.

The device of the tender can be provided with and/or connected to one or more screens located in the commercial establishment so as to be visible by clients thereof.

The predefined images and sequences of images can be repetitively replaced and/or adapted, e.g. daily, weekly or monthly.

Figure 3:
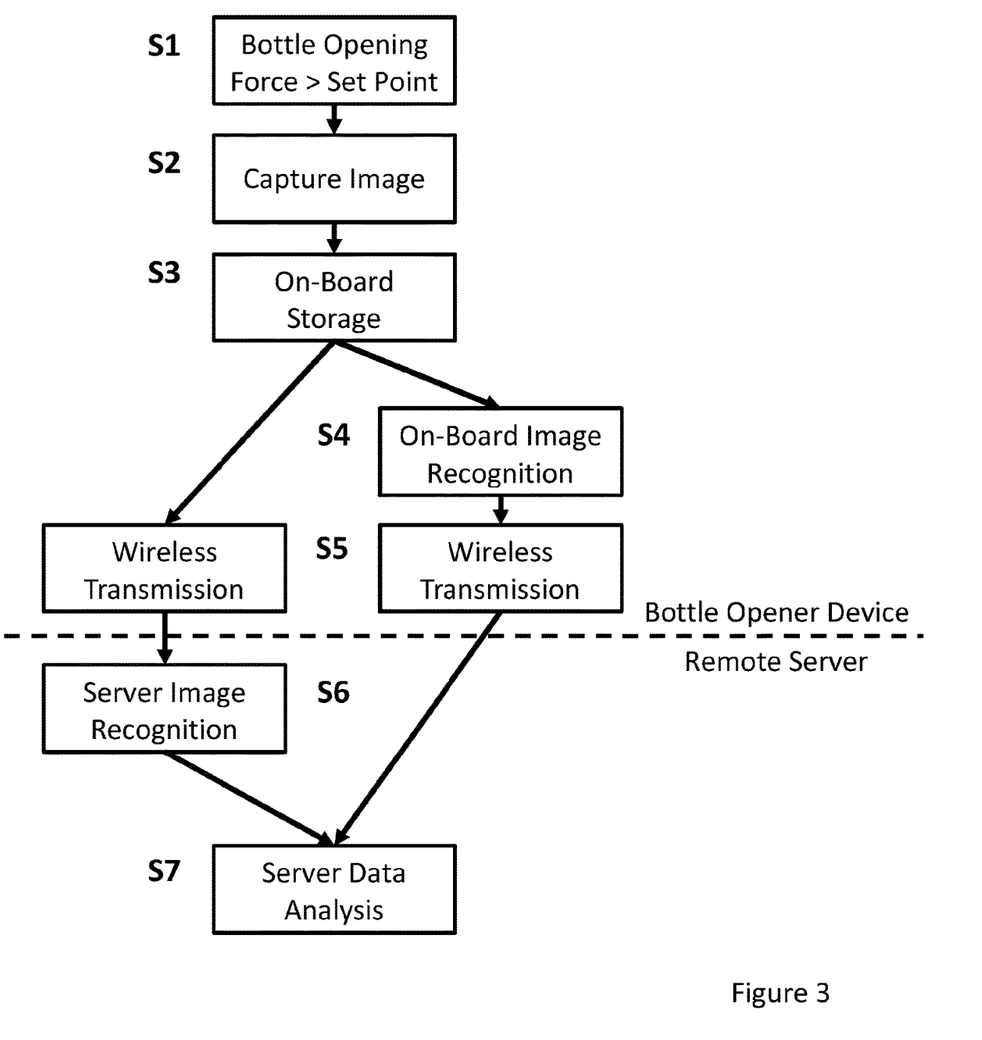
FIG. 3 shows a flowchart of an exemplary method for collecting data by means of the bottle opener of FIGS. 1 and 2.

FIG. 3 illustrates an exemplary flow cart of a method for counting beverage consumptions.

The method comprising steps of detecting an opening of a beverage bottle (S1) by sensing a force applied between a hook (104) and a fulcrum surface of the bottle opener that exceed a predefined threshold.

In response of said detection, a capturing of an image of the cap by means of an image sensor is triggered (S2) so as to capture a graphical sign on the cap.

The method further comprises a step of assigning to the captured image: a device and/or user digital identifier assigned to the bottle opener, an acquisition time, a timestamp, a geographical indication and/or a geographical coordinate.

The method further comprising a step of recognition and/or identifying a graphical sign (S4, S6) within the captured image by matching the graphical sign with graphical signs of a database. This step can be executed locally (e.g. by the bottle opener S4). This step can alternatively remotely executed (S6) by a remote device, such as a server, after that the capture image has been transmitted to such device (S5).

The method can comprises a step of sending an indication that the graphical sign has been recognized and/or identified within a database of graphical signs to a device of a user for notifying, informing, warning, advising, celebrating and/or thanking them for having opened and/or served a particular beverage bottle.

The device of the user is provided with a display unit for displaying a predefined image or sequence of images assigned to the recognized and/or identified graphical sign.

Figure 5:
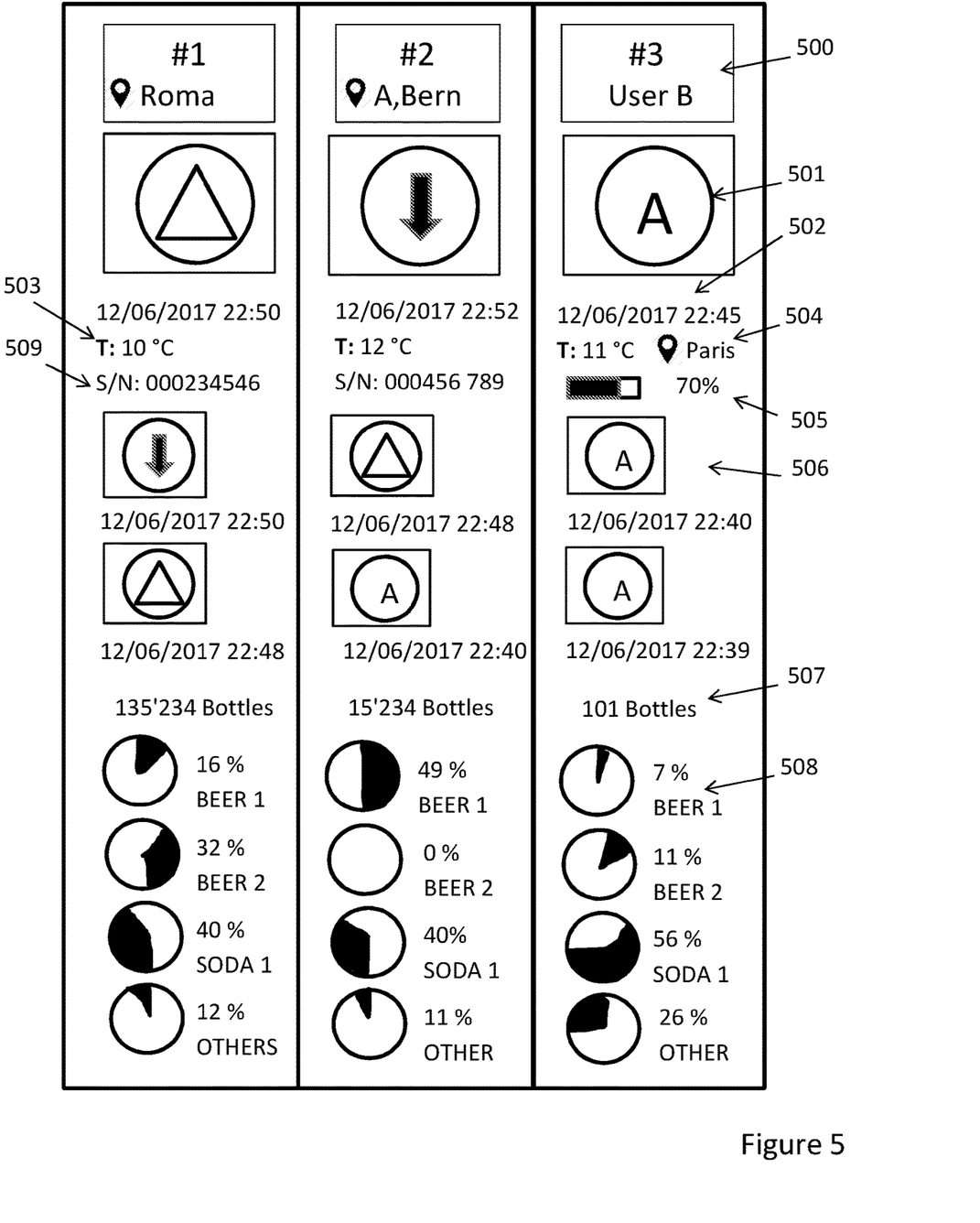
FIG. 5 shows an example of a dashboard displaying served and consumed beverages in a plurality of commercial establishments.

The consumption data collected on the server database can be aggregated, analysed and displayed on a dashboard (406,407) to the benefit of the bar owner, brand owner or beverage manufacturer, as illustrated in FIG. 5.

The dashboard can permit (a given user, a bar owner, a brand owner or a beverage manufacturer) to select, at an aggregate level 500, a given user (e.g. the user digital identifier), a given bottle opener (e.g. the device digital identifier), a given bartender, a geographical location and/or a time interval of interest, so as to provide a selection of data that have to be aggregated, analysed and displayed on (a portion of) the dashboard.

Evidently, the selection is limited by the permissions accorded to the given user, the bar owner, the brand owner and to the beverage manufacturer.

The bartender, the geographical location of interest and the time interval of interest are generally linked to more bottle openers, notably by means of the device digital identifier thereof.

The dashboard can thus display the last provided image 501 of a cap removed from a bottle with associated information, such as the associate time of the opening 502, the associated temperature of the cap/bottle 503, the location 504. The dashboard can display the status 505 of the battery of the bottle opener and/or the digital identifier 509 thereof.

The dashboard can display images 506 of previously removed cap with associated information.

The dashboard display count of bottle being opened, preferably within a selectable period of time, and statistic thereof.

The applicant found that an analysis of the duration of the movement and/or rotation of the hook or the fulcrum in response of a force (thereafter cap removal movement and/or rotation) can provide a reliable indication that the cap has been (really) removed from the bottle.

In particular, a comparison of the duration of cap removal movement and/or rotation with a statistical-determined minimal/maximal threshold can provide a reliable indication of a removal of a cap.

The bottle opener and the method for counting beverage consumptions can thus comprise a determination of the duration of the movement and/or the rotation of the hook or the fulcrum from the rest position in response to a force exceeds the predefined threshold.

The duration can be determined as a time interval between the moment the hook or the fulcrum leaves the rest position and the moment the hook or the fulcrum reaches a given relative position, notably the stop position or newly the rest position.

Moreover, the applicant found that a comparative analysis of the duration of the cap removal movement and/or rotation with the duration of the backward movement and/or rotation (i.e. movement and/or rotation of the hook or the fulcrum to the rest position) can also provide a more reliable indication that the cap has been (really) removed from the bottle.

In fact, the applicant found that a relatively slow backward movement and/or rotation of the hook or the fulcrum with respect to the cap removal one, is an indices of an unsuccessful (or fake) removal of the cap.

In fact, the duration of the backward movement and/or rotation of the hook or the fulcrum is notably affected, not only by the opposing force pushing the hook or the fulcrum back to the rest position, but also by the (removal) movement of the cap from the bottle.

The bottle opener and the method for counting beverage consumptions can thus be configured to, not only to determine of the duration of the cap removal movement and/or rotation, but also the duration of the backward movement and/or rotation.

The duration of the backward removal movement and/or rotation can be determined as the duration of the movement and/or rotation of the hook or the fulcrum from the given position (e.g. the stop position) to the rest position.

The bottle opener and the method for counting beverage consumptions can thus provide an indication that a removal of the cap of the bottle is underway based on:
- a comparison of the first and/or the second duration with a reference duration; and/or based on
- a comparison of the first duration with the second duration.

In particular, the bottle opener and the method for counting beverage consumptions can provide an indication that a removal of the cap of the bottle is underway if:
- the first and/or second duration is/are shorter than a given maximal threshold, and/or
- the first and/or second duration is/are longer than a given minimal threshold.

The bottle opener and the method for counting beverage consumptions can provide an indication that a removal of the cap of the bottle is underway if the second duration (i.e.

the duration of the backward movement and/or rotation) is shorter than the first duration (i.e. cap removal movement and/or rotation).

These solutions provide a more robust detection, notably against user's multiple attempts to remove the same cap, against spoofing, as well as against interactions of the bottle opener with other objects.

LIST OF REFERENCE NUMERALS 101 bottle opener
102 tip of hook
103 pivoting surface
104 hook
105, 106 sliding guide
107 sliding stop
108 handle
109 capturing direction of the camera
110 relative moving direction of the hook
111 body of the bottle opener
202 Compression spring
203 actuator of the electrical switch
204 electrical switch
205 electronic circuit
206 image sensor, e.g. camera
207 metal sensor
208 field-of-view of the image sensor
210 Wireless Data communication emitter/receiver
300 bottle
301 cap of the bottle
302 graphical element, e.g. logo
303 external surface of the cap
304 flange
403 Server
402 Internet
404 Bartender portable device
405 Portable device
406, 407 Dashboard
500 user/device/bartender/location
501 last recorded cap image
502 time assigned to the cap image
503 temperature of the cap/bottle assigned to the cap image
504 location assigned to the cap image
505 Battery status of the bottle opener
506 previously recorded cap image with data
507 numbers of bottles opened in a selected period
508 statistics about bottles opened in a selected period
509 Device digital number of the bottle opener
S1-S7 Steps of the method for collecting data

The invention claimed is:

1. A bottle opener for removing a cap from a bottle (300), comprising:
an image sensor for capturing an image of an external surface of the cap;
a fulcrum surface for contacting a portion of the cap;
a hook engageable under a flange of the cap for removing the cap from the bottle in response of a relative rotation of said bottle opener with respect to the bottle using the fulcrum surface as a fulcrum;
a cap removal detector arranged to provide an indication that a removal of the cap of the bottle is underway by sensing a force between the fulcrum surface and the hook; and
a metal sensor for detecting a metallic cap;
wherein the cap removal detector is arranged for triggering a capture of an image of said external surface of the cap when said force exceeds a predefined threshold; and
wherein the cap removal detector is arranged for triggering a capture of said cap if a metallic cap is detected.

2. The bottle opener according to claim 1, wherein
the cap removal detector is being arranged to sense said force by measuring a deformation of a deformable portion of the hook and/or of the fulcrum surface.

3. The bottle opener according to claim 1, wherein either one of the hook and the fulcrum surface is configured to move and/or rotate with respect to the other between the hook and the fulcrum surface so as to move and/or rotate from a rest position, in response of a force applied between the fulcrum surface and the hook exceeding said predefined threshold; and wherein the cap removal detector is arranged to sense a relative positioning of said one between the hook and the fulcrum surface.

4. The bottle opener of claim 3, wherein
the hook or fulcrum surface is configured to move and/or rotate from the rest position to a stop position in response of an application of a force between the fulcrum surface and the hook that is greater than said pre-defined force threshold; and wherein
the cap removal detector is configured to sense a positioning of the hook or of the fulcrum surface in the stop position.

5. The bottle opener of claim 3, wherein
the cap removal detector is arranged to determine a first duration of a movement and/or a rotation of the hook or fulcrum from the rest position; and wherein
the cap removal detector is arranged to provide said indication that a removal of the cap of the bottle is underway based on said first duration.

6. The bottle opener of claim 5, wherein
the cap removal detector is arranged to determine a second duration of a movement and/or rotation of the hook or fulcrum from the stop position to the rest position; and wherein
the cap removal detector is arranged to provide said indication that a removal of the cap of the bottle is underway based on said second duration.

7. The bottle opener of claim 5, wherein
the cap removal detector is arranged to provide said indication that a removal of the cap of the bottle is underway based on:
a comparison of the first and/or the second duration with a reference duration; and/or based on
a comparison of the first duration with the second duration.

8. The bottle opener of claim 3, further comprising
a guide for guiding the hook and/or the fulcrum surface along a translation axis.

9. The bottle opener of claim 1, wherein
the cap removal detector comprises an elastic element, operating between a portion of the body of the bottle opener and a surface of the hook.

10. The bottle opener of claim 1, wherein
the image sensor is positioned so as to capture an image of the cap along a capturing direction being substantially perpendicular to said external surface of the cap when the cap is engaged by the bottle opener for being removed from the bottle.

11. The bottle opener of claim 1, comprising a processing unit for recognition and/or identifying a graphical sign within the captured image.

12. The bottle opener of claim 1, wherein the bottle opener being configured to store a device digital identifier of, or assigned to, the bottle opener and/or a user digital identifier assigned to a user of the bottle opener.

13. The bottle opener of claim 1, wherein
the bottle opener is configured to provide an acquisition time and/or timestamp to the captured image.

14. The bottle opener of claim 1, wherein
the bottle opener is configured to provide a geographical indication and/or coordinate to the captured image.

15. The bottle opener of claim 1, wherein
the bottle opener is configured to provide a temperature of the cap and/or of the bottle to the captured image.

16. The bottle opener of claim 1, comprising
a data transmitter configured to send an indication that a graphical sign within the image has been recognized and/or identified within the graphical signs of the database, the captured image, the device digital identifier, the user digital identifier, the acquisition time and/or timestamp, the geographical indication, the coordinate and/or said temperature for further processing.

17. A method for counting beverage consumptions, the method comprising steps of:
detecting an opening of a beverage bottle by sensing a force applied between a hook and a fulcrum surface of a bottle opener that exceed a predefined threshold, wherein the hook and/or the fulcrum surface is configured to relatively move and/or rotate from a rest position in response of the force applied between the hook and the fulcrum surface exceeding said predefined threshold;
in response of said detection, capturing an image of the cap by means of an image sensor; and
assigning to said image: a device and/or user digital identifier assigned to the bottle opener, an acquisition time, a timestamp, a geographical indication, a geographical coordinate and/or a temperature of the cap and/or of the bottle,
wherein said step of sensing a force comprises sensing a relative positioning of the hook and/or of the fulcrum surface; and
wherein said step of detecting an opening of a beverage bottle comprises a step of
determining a first duration of a movement and/or a rotation of the hook or the fulcrum from the rest position; and wherein said step of detecting an opening of a beverage bottle comprises a step of
comparing the first and/or the second duration with a reference duration; and/or
comparing the first duration with the second duration.

18. The method according to claim 17,
further comprising a step of configuring the hook and/or the fulcrum surface to relatively move and/or rotate from the rest position to a stop position in response of a force applied between the fulcrum surface and the hook exceeding said predefined threshold;
and wherein said step of sensing a force comprises sensing the hook or of the fulcrum surface in the stop position.

19. The method according to claim 17, wherein said step of detecting an opening of a beverage bottle comprises a step of
determining a second duration of a movement and/or rotation of the hook or the fulcrum from the stop position to the rest position.

20. The method according to claim 17, further comprising a step of recognition and/or identifying a graphical sign within the captured image by matching the graphical sign with graphical signs of a database.

21. The method according to claim 20, further comprising a step of using said recognised and/or identified graphical sign for querying a database for providing an indication and/or a verification that the bottle was opened for the first time and/or the bottle was produced in a given factory and/or registered into the database.

22. The method according to claim 20, further comprising a step of sending an indication that the graphical sign has been recognized and/or identified within a database of graphical signs to a device of a user for notifying, informing, warning, advising, celebrating and/or thanking them for having opened and/or served a particular beverage bottle.

23. The method according to claim 17, further comprising a step of analysing, aggregating, summarizing and/or displaying beverages consumptions, on a dashboard.

* * * * *